United States Patent Office 3,390,286
Patented June 25, 1968

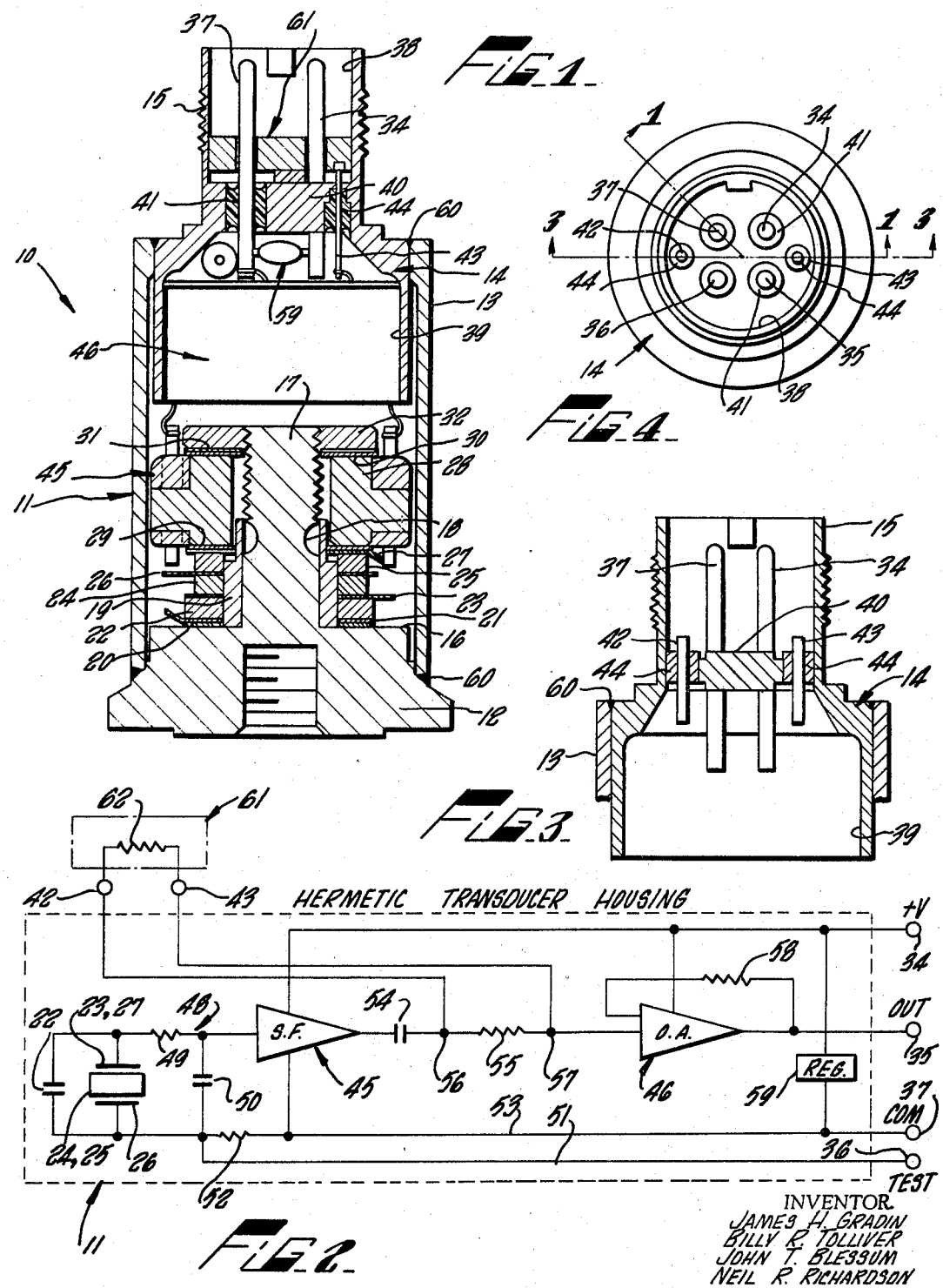

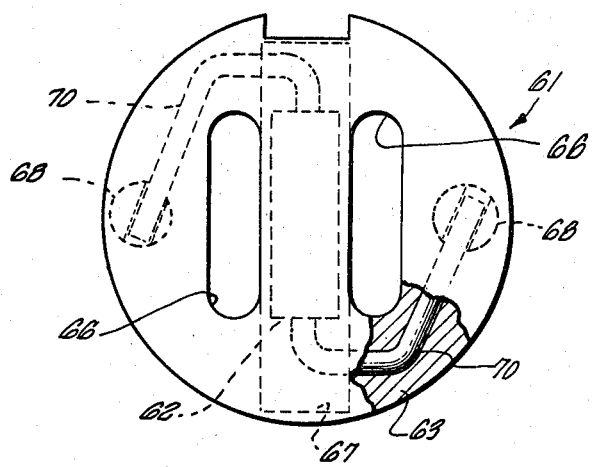
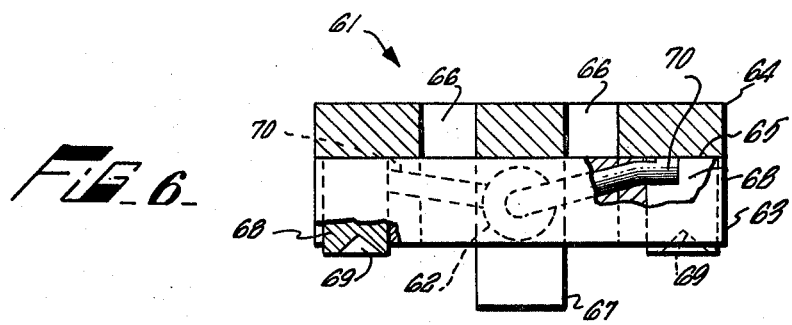
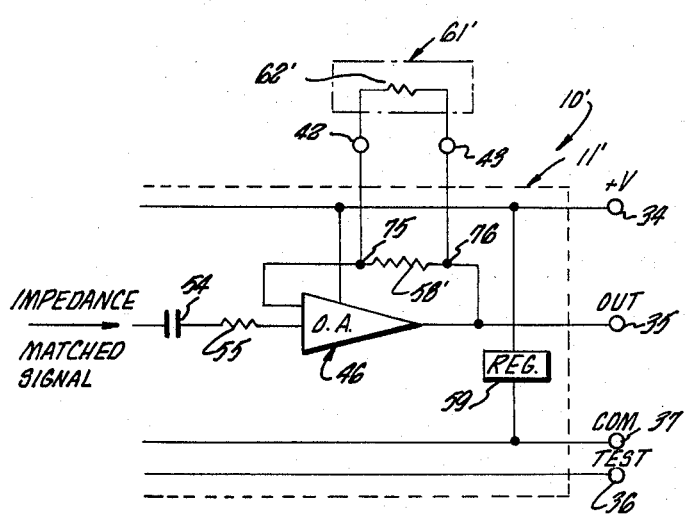

3,390,286
HERMETICALLY SEALED INSTRUMENT TRANSDUCER WITH EXTERNAL SENSITIVITY SELECTION
James H. Gradin, Whittier, Billy R. Tolliver, Glendora, John T. Blessum, Arcadia, and Neil R. Richardson, Temple City, Calif., assignors to Consolidated Electrodynamics Corporation, Pasadena, Calif., a corporation of California
Filed Mar. 29, 1966, Ser. No. 538,331
11 Claims. (Cl. 310—8.4)

This invention relates to instrument transducers and, more particularly, to a hermetically sealed transducer provided with an external range selection device.

Piezoelectric acceleration measurement transducers, i.e., piezoelectric accelerometers, have long been manufactured as a compromise solution to three basic problems encountered with respect to such transducers. The problems involve the troublesome effect of external capacitance and load on the transducer, the protection of the piezoelectric crystal and its associated electronic circuitry from severe or damaging environments, and the wide variations of magnitudes of vibration encountered at various times by each accelerometer user.

The transducer housing the piezoelectric crystal and its actuating mass, known as a seismic mass, normally is located remote from the instruments which are used to observe and record the variations in the charges generated by the crystal. The instruments used to observe and record the changes in the transducer output are usually voltage-sensitive, whereas the piezoelectric crystal can be viewed as an electromechanical charge generator. Because the magnitude of the charge generated by a piezoelectric crystal per G of acceleration (a G being the value of the acceleration of a free falling object at the earth's surface) is small, and because the voltage associated with two different charges (such as the opposite but basically equal charges present at the opposite surfaces of a deformed piezoelectric crystal) is dependent upon the capacitance of the circuit provided to interconnect the charges, it is apparent that any unknown or variable capacitance in the connection between a recording or displaying instrument and the crystal of a piezoelectric transducer may adversely affect the measurement obtained at the instrument. It is thus further apparent that variations between different cables used to connect a transducer to a measuring instrument at different times, or variation in the capacitance of a single cable, has the effect of changing the apparent sensitivity of the transducer, sensitivity being measured by volts per G acceleration. Changes in electric fields in areas through which the conductor passes have the same effect. In addition, electrical leakage can change the sensitivity of the transducer at low frequencies.

The problem of external capacitance on the performance of piezoelectric transducers can be and has been overcome by the use, within the transducer itself in close proximity to the crystal, of low capacitance electronic impedance matching circuits which condition the signal in desired ways and render the signal produced at the transducer output terminals relatively insensitive to capacitance and field effects outside the transducer. The use of charge amplifiers within the transducer housing is also beneficial.

Where a piezoelectric transducer is to be used under severe environmental conditions, the transducer housing is hermetically sealed by the use of glass-to-metal seals or by welding the housing closed. This procedure is also of benefit in sealing from the transducer contaminating materials which produce electrical leakage.

The use of hermetic seals in the manufacture of piezoelectric transducers is compatible with the use of signal conditioning and amplifying circuitry within the transducer housing, but it has not heretofore been regarded as being compatible with successful solutions to the third problem mentioned above, i.e., the wide variation in vibration magnitudes (accelerations) encountered by accelerometer users. Because each piezoelectric accelerometer crystal has a fixed sensitivity, it is limited in response to small vibrations by the resolution of the electronics in the displaying and recording instruments connected to the transducer, as well as by noise levels in the overall instrumentation system. If amplifiers are used, either internally or externally of the transducer, high amplitude vibrations may produce a transducer output large enough to overload or damage the electronics. A given configuration of transducer and its associated electronics has therefore previously been unsuitable for measuring accelerations over a wide range of values. One way to overcome this problem is to provide a transducer for measuring accelerations in a narrow range, and to use a differently rated transducer for a different range. This solution, however, is manifestly costly to a transducer use because it requires that a large inventory of transducers be maintained. A more practical and economical solution is to construct a transducer incorporating an amplifier, and to arrange the amplifier so that certain circuit parameters may be changed to alter the sensitivity of the transducer as desired. This solution, however, requires that the transducer housing be openable.

From the foregoing, it is apparent that existing piezoelectric accelerometers constitute comprise solutions to one or two, but not all three of the problems discussed. This invention, on the other hand, provides a piezoelectric accelerometer which effectively overcomes all three of these problems effectively and efficiently. The output of the transducer is in such form that external capacitances, particularly cable capacitance, and field effects are not troublesome. The transducer includes an amplifier for the signal developed by the piezoelectric crystal. The transducer housing, including the amplifier, is hermetically sealed, yet the circuit parameters of the transducer electronics may be varied to alter the range of the transducer by adjusting the output of the amplifier. All these features are provided in a transducer which is compact and light in weight.

The present invention is described herein with reference to a piezoelectric accelerometer because the benefits and the utility of the invention are more readily apparent in such a transducer. It will be appreciated, however, that the invention may be practiced in the context of a magnetostrictive transducer, for example.

Generally speaking, this invention provides an instrument transducer including a housing. The housing contains signal generating means which function to generate a signal in response to variations in a selected physical phenomenon presented to the transducer and to which the transducer is sensitive. Terminal means, including a pair of terminal members, are carried by the housing. The terminal means, including the terminal members, are accessible to the exterior of the housing and extend into the interior of the housing. Circuit means are provided in the housing coupled between the signal generating means and the terminal means. The circuit means operates upon the signal generated by the signal generating means in a selected manner determined by the circuit means and also prevents the signal as operated upon to the terminal means other than the terminal members as a transducer output signal. The terminal members are conductively connected within the housing to separate locations in the circuit means. The housing is hermetically sealed including around the terminal means.

The above-mentioned and other features of the invention are more fully set forth in the following description of a presently preferred embodiment of the invention, the description being presented with reference to the accompanying drawings, wherein:

FIG. 1 is a cross-sectional elevation view of a piezoelectric accelerometer showing the present invention;

FIG. 2 is an electrical schematic diagram of the transducer shown in FIG. 1;

FIG. 3 is a cross-sectional elevation view of a portion of the transducer taken along lines 3—3 of FIG. 4;

FIG. 4 is a top plan view of the transducer shown in FIG. 1;

FIG. 5 is a top plan view, with parts broken away, of a sensitivity range selection resistance unit for use with the accelerometer shown in FIG. 1;

FIG. 6 is a side elevation view, with parts broken away of the resistance unit shown in FIG. 5; and FIG. 7 is a schematic diagram of a portion of the circuitry of another transducer according to this invention.

FIG. 1 shows an instrument transducer 10 constructed in accordance with this invention. The transducer is a piezo-electric accelerometer which includes a housing 11 having a massive base 12, a cylindrical shell 13 mounted on the base, and a cap member 14 which defines a portion 15 of an electrical connector structure and which is secured to the shell in spaced relation to the base. The base has a flat annular surface 16 within the housing surrounding the lower end of a stem 17 which extends integral with the base axially of shell 13 partially toward the housing cap. A circumferential recess 18 is formed in the stem approximately around its midlength. An electrically non-conductive sleeve 19 surrounds the lower portion of the stem. A non-conductive annular insulator disc 20 bears against surface 16 around the sleeve and supports a conductive first temperature compensating capacitor terminal and spacer disc 21. An annular rigid temperature compensating capacitor 22 is supported on disc 21 and carries a second annular capacitor terminal and spacer disc 23 which also serves as a terminal for a first annular piezoelectric crystal 24 disposed circumferentially of the sleeve. A second annular piezoelectric crystal 25 is disposed above crystal 24 and is spaced from crystal 24 by an annular second crystal terminal disc 26. The upper surface of the upper or second crystal carries a third crystal terminal disc 27. Crystals 24 and 25 are arranged so that terminal discs 23 and 27 assume charges of the same sign and so that terminal disc 26 assumes a charge of opposite sign when the crystals are deformed. In the schematic diagram of FIG. 2, the crystals are shown as a single crystal 24, 25 since they function in the transducer as a single crystal.

An annular seismic mass 28 is disposed around the stem above the crystals and is spaced from the crystals by a non-conductive annular insulator disc 29 engaged between the mass and terminal disc 27. An annular insulating spacer disc 30 and a washer 31 space the mass from a nut 32 threaded onto the upper end of the stem to bias the mass under a predetermined load toward the crystals. The stem and the nut form a compliant mechanism for biasing the mass toward the crystals. When the transducer is subjected to an acceleration in a direction axially of the stem, the mass moves toward and away from base 12 thereby producing a deformation of crystals 24 and 25. The crystals therefore generate charges which are additive and which are indicative of the magnitude of the acceleration applied to the transducer.

Four parallel terminal pins 34, 35, 36 and 37 are mounted in cap 14 to extend into a recess 38 opening to the exterior of the transducer housing. The portion of the housing surrounding the recess defines an externally threaded portion of one component of a two component electrical connector, preferably the male component of a connector adapted to mate with the female component of a Gulton C-30 P4-HT connector. Terminal pins 34-37 are arranged in a rectangular array centrally of the cap and extend a substantial distance into recess 38, as well as a substantial distance into a recess 39 opening to the interior of housing 11. Recesses 38 and 39 are separated from each other by a cap web or diaphragm 40 which forms the base of recess 38. The terminal pins are mounted in diaphragm 40 by means of ceramic insulating plugs 41 fused both to the pins and the diaphragm to define hermetic seals around the pins.

A pair of range selector disc terminal pins 42 and 43 are mounted in the cap diaphragm as shown in FIGS. 1, 3 and 4. Pins 42 and 43 are located at diametrically opposed locations on opposite sides of the array of pins 34-37 and extend only a short distance into recess 38 from the diaphragm. Pins 42 and 43, however, extend a substantial distance into recess 39. The pins are hermetically sealed to the diaphragm by ceramic insulating plugs 44.

An impedance matching amplifier 45 is disposed in housing 11 for matching the high impedance of crystals 24 and 25 to the low input impedance of an operational amplifier 46, also disposed in the housing, and of a telemetering, displaying or recording devices coupled to terminals 35 and 37 and located remote from the transducer. The impedance matching amplifier preferably is a source follower amplifier using no "boot-strap" capacitor to maintain the gate and source connections of a field effect transistor at the same potential; it will be understood, however, that any suitable impedance matching amplifier other than a source follower amplifier may be used, if desired, without departing from the scope of this invention. Such a source follower amplifier has a gain factor less than but approaching unity. Preferably about 0.98. Also, in order that the transducer may be made as compact and as light as possible, it is preferred that the circuit components of the impedance matching amplifier be mounted to and carried by seismic mass 28, as shown in FIG. 1; such a transducer construction feature is illustrated and described more fully in application Ser. No. 458,579 filed May 25, 1965 by Jomes H. Gradin, Billy R. Tolliver and Samuel Elazar for Piezoelectric Instrument Transducers assigned to the assignee of this invention and issued on the same date as this patent.

FIG. 2 is a schematic representation of the electrical circuitry of transducer 10. As mentioned before, temperature compensating capacitor 22 is coupled in parallel across piezoelectric signal generating crystals 24 and 25, and is such that its capacitance varies with temperature substantially in inverse proportion to the variation with temperature of the total capacitance of the crystals. A low pass filter 48 for attenuating the output of the crystals at high frequencies is coupled in parallel with the crystals. The filter is provided for extending the range of linear response of the transducer partially into the range of frequencies in which the transducer movement tends to resonate. The filter is comprised of a resistance 49 and a capacitance 50. The common connection between crystal electrode terminal 26 and capacitances 22 and 50 is connected to connector terminal pin 36 (a test terminal) by a conductor 51 within the transducer, and to common terminal pin 37 via a series connected resistance 52 and conductor 53 within the transducer. Resistance 52 is provided so that a signal can be applied from an oscillator or the like across terminals 36 and 37 to simulate operation of the transducer to test the electronic circuitry within the transducer.

The output of low pass filter 48 is applied as the input to impedance matching amplifier 45; the impedance matching amplifier is also connected within the transducer to connector terminal pin 34 (a transducer electronics energization terminal) and to common terminal 37. The output of the impedance matching amplifier is applied as the input signal to the operational amplifier via a series connected decoupling capacitor 54 and an operational amplifier input impedance resistance 55. The decoupling capacitor is provided to isolate any direct current component of the impedance matching amplifier output signal from the operational amplifier. Resistance 55 has a first terminal 56 which is connected to capacitance 54 and a second terminal 57 which is connected to the input of amplifier 46.

The output of the operational amplifier is applied within the transducer to connector output terminal pin 35 and, via a feedback impedance 58, to the input of the amplifier. An energization voltage regulator 59 is coupled within the transducer across terminal pins 34 and 37.

In the past, where it has been desired that the sensitivity of the transducer be changed, it has been necessary to open the transducer housing and rewire the circuitry of the amplifier 46 to vary its input impedance. Such a process alters the output of the transducer in terms of the number of volts potential difference presented across terminals 35 and 37 per G input to the transducer. Such a practice, as shown above, is undesirable where the transducer must be used in a severe environment because contaminants may enter the housing each time it is opened. Transducer 10, however, is constructed so that the sensitivity of the transducer may be varied rapidly and conveniently by a person of relatively little skill without opening the transducer housing itself. For this reason, the housing base, shell and cap are welded to each other as at 60 to provide a truly hermetically sealed transducer.

As shown in FIG. 2, terminals 56 and 57 of the operational amplifier input impedance resistance are separately connected within the transducer to respective ones of terminal pins 42 and 43. To change the sensitivity of the transducer, it is only necessary to change a sensitivity selecting ranging disc 61 (see FIGS. 5 and 6) incorporating a ranging resistance 62 of known value for a different disc incorporating a ranging resistance of a different known value. This change is made externally of the transducer housing and has the effect of varying the value of the operational amplifier input impedance. The effect externally of the transducer of such a procedure is a change in the sensitivity of the transducer.

As shown in FIGS. 1, 5 and 6, a sensitivity selecting ranging disc 61 has an esentially circular planform configuration and is sized to fit within recess 38 of housing cap 14. The disc is essentially planar and includes a body 63 preferably fabricated of hard-setting potting compound. A layer of resilient cushion material 64 extends over the entire extent of an upper surface 65 of the body. The cushion material preferably is a room temperature vulcanizing silicone compound such as General Electric RTV60 silicone potting material. A pair of parallel slots 66 are formed through the body and the cushion material to permit the disc to be passed over terminal pins 34–37, as shown in FIG. 1, into engagement with pins 42 and 43. A strip 67 of resilient cushion material is secured to the underside of the body diametrically thereof between the slots to provide central support for the body in use and thereby prevent the disc from cracking.

A resistor of selected value is embedded in the body of the disc between the slots and defines the ranging resistance 62 of the disc. Because the resistor is embedded in the body of the disc, it is hermetically sealed from the transducer environment. A pair of conductive terminal elements 68 are embedded in the body at diametrically opposed locations outwardly of slots 66 and extend below the bottom of the body. The lower ends of the terminal elements are conically recessed as at 69. The resistor has a pair of oppositely extending lead conductors 70 which are connected to respective ones of the terminal elements within the disc. A number of such discs, each incorporating a resistance of different value may be provided with transducer 10.

Preferably each disc carries indicia indicating what the sensitivity of transducer 10 will be when the disc is engaged with terminal pins 42 and 43 so as to place resistance 62 therein in parallel with the transducer operational amplifier input impedance resistance.

Assume that transducer 10 is to be used to measure the accelerations associated with certain vibrations, it being expected that the accelerations will be of relatively low value. For such acceleration measurement, relatively high transducer sensitivity is desired. Accordingly a ranging disc carrying indicia showing the desired transducer sensitivity is selected and is inserted into recess 38 so that terminal elements 68 engage terminal pins 42 and 43 in the recess. The connector component which mates with the connector component defined by the transducer housing is then secured in place to force the ranging disc into intimate engagement with terminal pins 42 and 43. The transducer is then used as intended. At some later time it may be desired to use the same transducer to measure certain accelerations anticipated to be of relatively high magnitude; the transducer sensitivity must be adjusted, therefore, to define a lower volts per G characteristic. To accomplish this adjustment, the connector is disconnected and the ranging disc previously inserted is removed and a different disc, corresponding to the desired new transducer sensitivity characteristic, is inserted in its place. Removal of the former disc may be carried out easily by grasping the disc with a pair of tweezers engaged in respective ones of slots 66 between the ones of terminal pins 34–37 passing through these slots. It is apparent that this change in transducer sensitivity is effected without in any way impairing the integrity of the hermetic seals between the various elements of the transducer housing. When the transducer is in use, the ranging disc is protected by the assembled connector.

FIG. 7 is a schematic diagram of the electrical circuitry of another piezoelectric accelerometer 10' having a hermetically sealed housing 11'. Transducer 10' is identical to transducer 10 except to the extent shown in FIG. 7 and described below.

The sensitivity of either of transducers 10 and 10' is determined by the ratio of the operational amplifier input and feedback impedances. In transducer 10, the sensitivity of the transducer is adjusted by varying the effective value of the operational amplifier input impedance relative to the feedback impedance by paralleling an external impedance with an impedance internally of the transducer. As the value of impedance 62 decreases, the sensitivity of transducer 10, measured in volts per G input, is increased.

Transducer 10' includes an operational amplifier feedback impedance 58' having a first terminal 75 connected within housing 11' to terminal pin 42 and to the operational amplifier input. Impedance 58' has a second terminal 76 connected within the transducer to terminal pin 43 and to the output of the operational amplifier. A plurality of sensitivity selecting ranging discs 61', each including an impedance 62' of different value, are also provided. Discs 61' are in accord with the foregoing description of discs 61, and their use is as described above. Transducer 10', therefore, is a hermetically sealed device providing external sensitivity adjustment capability merely by varying the one of discs 61' which are engaged with terminal pins 42 and 43 to vary the effective value of the operational amplifier feedback impedance.

In transducer 10', an increase in the value of impedance 62' produces an increase in the sensitivity of the transducer.

Both transducers 10 and 10' are constructed so that the sensitivity thereof is varied by placing an external impedance in parallel with an impedance internally of the transducer. It will be appreciated that the amplifier input impedance (FIG. 2 re transducer 10) or the amplifier feedback impedance (FIG. 7 re transducer 10') could easily be provided completely externally of the transducer in a ranging disc. If, however, a ranging disc were inadvertently omitted from connection to terminal pins 42 and 43, the transducer would not be properly operable. For this reason, the use of changeable external impedances in parallel with internal fixed impedances is preferred in the practice of this invention because, in the event the external impedance is inadvertently omitted, the transducer is still operable.

From the foregoing, it is apparent that this invention provides a transducer which incorporates effective solutions to the three problems reviewed above. No compromise detracting from one solution in favor of any of the others is involved. Further, the transducer is smaller and lighter in weight than an equivalent transducer provided with an openable case. The transducer itself is less expensive to fabricate than an openable transducer, and the ranging discs are low in cost. The use of a single transducer and an inventory of inexpensive ranging discs leads to a reduction in the size and cost of the instrument inventory previously required by any substantial user of transducers.

The present invention may be used to advantage in substantially any transducer using an active signal generating mechanism wherein energy conversion principles are relied upon, such as electromagnetic, magnetostrictive and thermoelectric mechanisms as opposed to mechanisms relying upon energy controlling principles exemplified by strain gage transducers.

What is claimed is:

1. An instrument transducer including a housing, signal generating means in the housing for generating a signal in respose to variations in a selected physical phenomenon presented to the transducer and to which the transducer is sensitive, terminal means including a pair of terminal members carried by the housing accessible to the exterior thereof and extending into the interior thereof, circuit means in the housing coupled between the signal generating means and the terminal means for operating upon the generated signal in a selected manner determined by the circuit means and for presenting the signal as operated upon to the terminal means other than the terminal members as a transducer output signal, means conductively connecting each terminal member to a separate location in the circuit means, and means hermetically sealing and closing the housing including around the terminal means.

2. A transducer according to claim 1 wherein the circuit means includes an impedance between said separate locations.

3. A transducer according to claim 1 including impedance means removably engageable with the terminal members externally of the housing for effectively altering a selected parameter of the circuit means without disturbing the hermetic closure of the housing.

4. A transducer according to claim 3 wherein the pair of terminal members extend a selected distance exteriorly of the housing, the terminal means further includes a plurality of terminal pins extending through the housing adjacent the terminal members to ends spaced externally of the housing a distance substantially greater than said selected distance, and insulating means defining a hermetic seal between the housing and the terminal pins and members, said terminal pins and the housing adjacent thereto defining a component of an electrical connector.

5. A transducer according to claim 4 wherein the impedance means comprises a body, a pair of terminal elements carried by the body and exposed from one surface thereof in such positions relative to the body as to be engageable with the exterior ends of the terminal members, an impedance of selected value carried by the body and connected between the terminal elements, and aperture means through the body for the terminal pins so that the body is removably insertable over the terminal pins to adjacent the housing for engagement of the terminal elements with the exterior ends of the terminal members.

6. A transducer according to claim 5 wherein the housing defines a recess open to the exterior of the housing and having a base, the terminal members extend through the base and have their ends externally of the housing disposed in said recess, and the impedance means body is sized to fit within the recess adjacent the base thereof.

7. A transducer according to claim 5 wherein the aperture means comprises a pair of slots through said body on opposite sides of a central portion of the body, the terminal elements are partially embedded in the body outwardly of the slots from the central portion, and the selected impedance is embedded in the body central portion, and including a pad of resilient cushion material secured to said one surface of the body along said central portion for engaging the housing when the impedance means is engaged with the terminal members to support the body between the terminal members.

8. A transducer according to claim 7 wherein the body has a surface opposite from said one surface, and a layer of resilient cushion material secured to said opposite surface over substantially the entire areal extent thereof.

9. A transducer according to claim 3 wherein the transducer is a piezoelectric accelerometer, the signal generating means comprises a piezoelectric crystal, a seismic mass adjacent the crystal and compliant means biasing the seismic mass toward the crystal.

10. A transducer according to claim 9 wherein the circuit means includes an impedance matching amplifier coupled to the crystal and having an output and an operational amplifier coupled between the output of the impedance matching amplifier and the terminal means other than said terminal members, an impedance coupled between the impedance matching and operational amplifiers and comprising an input impedance to the operational amplifier, and wherein said selected parameter of the circuit means is the operational amplifier input impedance.

11. A transducer according to claim 9 wherein the circuit means includes an operational amplifier having an input and an output coupled between the crystal and the terminal means other than said terminal members, and an amplifier feedback impedance coupled between the amplifier input and output, and wherein the selected parameter of the circuit means is the operational amplifier feedback impedance.

References Cited

UNITED STATES PATENTS

| | | | |
|---|---|---|---|
| 3,278,770 | 10/1966 | Shoh | 310—8.1 |
| 3,283,590 | 11/1966 | Shang | 310—8.4 |
| 3,285,074 | 11/1966 | Elazar | 310—8.4 |

J. D. MILLER, *Primary Examiner.*